United States Patent [19]

Texier et al.

[11] 3,856,917

[45] Dec. 24, 1974

[54] PROCESS FOR TREATING RESIDUAL SOLUTIONS CONTAINING HEXAVALENT CHROMIUM COMPOUNDS

[75] Inventors: Nicole Texier, Paris; Jean-Pierre Cuer, Colombes; Michel Gabriel, Casablanca, all of France

[73] Assignee: Societe Anonyme Products Chimiques Uqine Kuhlmann, Paris, France

[22] Filed: Apr. 12, 1973

[30] Foreign Application Priority Data
Apr. 14, 1972 France ............................. 72.13318

[52] U.S. Cl. .................... 423/54, 423/596, 210/37, 210/32
[51] Int. Cl. ............................................ C01g 37/14
[58] Field of Search ................... 423/54, 596, 658.5; 210/37, 38, 30–32

[56] References Cited
UNITED STATES PATENTS

| | | | |
|---|---|---|---|
| 2,955,932 | 10/1960 | Goren .............................. | 423/54 X |
| 3,223,620 | 12/1965 | Oberhofer ........................ | 210/37 X |
| 3,306,859 | 2/1967 | Sloan et al. ...................... | 210/37 X |
| 3,664,950 | 5/1972 | Saraseno et al .................. | 210/37 X |

FOREIGN PATENTS OR APPLICATIONS

| | | | |
|---|---|---|---|
| 698,700 | 11/1964 | Canada .............................. | 423/54 |
| 733,029 | 4/1966 | Canada .............................. | 423/54 |

*Primary Examiner*—Herbert T. Carter
*Attorney, Agent, or Firm*—Hammond & Littell

[57] ABSTRACT

A process for treating residual solutions containing hexavalent chromium compounds in order to provide them non-polluting and at the same time providing sodium chromate by the extraction of hexavalent chromium by means of an insoluble inorganic solvent and reextraction.

The aqueous solution used for the reextraction of hexavalent chromium from the organic solvent is a sodium chromate solution. A concentrated sodium bichromate solution is obtained.

Application is to the treatment of residual waters from processes for the extraction of chromium from ores thereof, or from electroplating installations.

9 Claims, 1 Drawing Figure

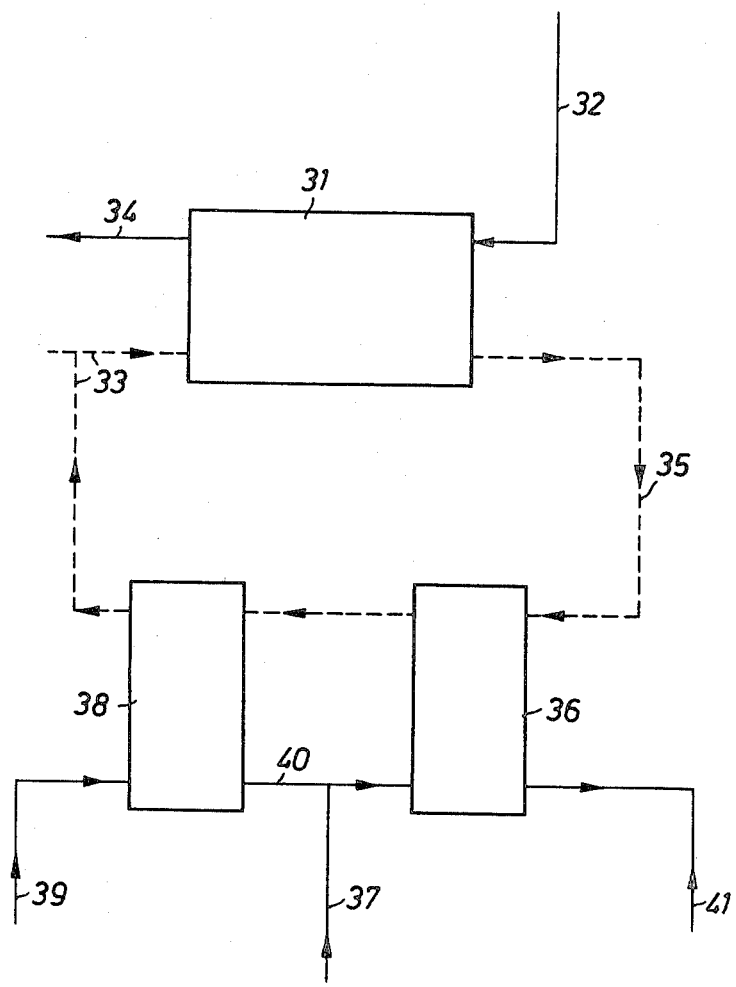

PROCESS FOR TREATING RESIDUAL SOLUTIONS CONTAINING HEXAVALENT CHROMIUM COMPOUNDS

The invention relates to the treatment of residual solutions containing hexavalent chromium compounds.

The extraction of chromium from its ores by wet method processes for the preparation of various compounds, such as chromium sulphate or basic chromium sulphate, chromic acid, chromates or bichromates, always results in residual solutions containing large amounts of chromium derivatives and, notably, hexavalent chromium derivatives. Similarily, electroplating installations dispose of large amounts of solutions which have become unusable but which still contain high levels of chromium.

All said residual solutions have the characteristic of being charged with all sorts of impurities, and notably metal impurities, which prevent their being reused directly. For many years, manufacturers preferred to discharge these solutions into rivers rather than purify them or recover chromium contained in these solutions. Yet chromium compounds, and especially hexavalent chromium compounds, are redoubtable pollutants as in addition to the toxicity of chromium, it has a high oxidizing capacity. Regulations now in force limit the concentration of hexavalent chromium in liquid effluents discharged into watercourses to a level of 0.1 to 1 mg per liter, according to the country, whereas up to 2 mg per liter of trivalent chromium is tolerated.

Various processes for the treatment of liquid effluents containing hexavalent chromium have already been suggested or put into effect. It is thus possible to reduce hexavalent chromium and precipitate chromic hydroxide $Cr(OH)_3$. Many reducing agents are known, one of the least costly being sulphurous acid. Precipitation involves neutralization of the solution with a cheap reagent such as lime. This process has two drawbacks. Firstly the $Cr(OH)_3$ precipitate is difficult to filter; it is very gelatinous and needs to be treated with a filter press practice. In addition as it is very impure, it cannot be reused economically; it then forms a solid effluent and the stocking of which constitutes a further risk of pollution.

Another process consists of using the properties of ion exchange resins to extract hexavalent chromium from liquid effluents. As said chromium is in the form of anions, it can be extracted selectively with a basic anionic resin. Elution is effected by washing the resin with a soda solution which takes up sufficiently pure sodium chromate to be reused in the preparation of various compounds.

It is also known to extract hexavalent chromium compounds dissolved in an aqueous solution by a water-insoluble organic liquid, but the application of this practice to the treatment of industrial waste waters has not been possible up to now owing to the lack of economical processes for reextracting hexavalent chromium from the organic solution. In order for such a process to be economical it should directly provide a negotiable chromium compound, that is to say salts such as sodium bichromate. Then again, the solvent used to effect extraction should not only have the usual properties required for this type of treatment, but it should also have an excellent resistance to oxidizing agents, even in a highly acid medium. Indeed, this situation frequently occurs, as the waste solutions obtained from electroplating installations or residual solutions from the production of chromic acid are highly sulphuric solutions of chromic acid.

The object of the present invention is the treatment of residual solutions containing hexavalent chromium compounds in order to prevent stream pollution, while permitting the hexavalent chromium they contain to be recovered as a commercially available salt, namely sodium bichromate. Said process comprising, under economical conditions, the reextraction of dissolved hexavalent chromium in a water-insoluble organic solvent, the said solution being obtained from liquid-liquid extraction treatment of said residual solutions. It is characterized in that the aqueous solution used for the reextraction of hexavalent chromium from the organic solvent is a sodium chromate solution.

A concentrated sodium bichromate solution is thus obtained from which this salt can be crystallized out.

In according to the present invention the residual solution can be of very varied compositions. Notably, apart from hexavalent chromium compositions, they may contain a large number of metal impurities, such as alkaline and alkaline-earth metals, iron and metals of the family of iron, aluminium, magnesium, zinc, titanium, etc... They can also contain trivalent chromium. The exact compositions vary with the origin of said solutions. There should notably be mentioned the solutions discharged by installations treating chrome ore, or by electroplating installations.

The concentration of hexavalent chromium compounds in said solutions can vary in a very large range. It is normally in the range of 0.01 to 200 g/l, expressed as $CrO_3$, and preferably between 0.1 and 30 g/l.

Most frequently, said solutions are very strongly acid and can be used as they are without previous neutralization. This is very advantageous; if it were necessary to effect even a partial neutralization with a cheap base, in fact with lime, the precipitated lime sulphate would have to be separated by filtration, with the difficulties this involves, and washed to deplete it of the initial solution and the chromium compounds with which it may be impregnated.

In addition to the qualities required by the extraction itself, that is to say a high coefficient of separation and an ability to separate easily from the aqueous solution, the organic solvent should possess an excellent oxidation stability, even in a strongly acid medium.

These requirements greatly reduce the choice of suitable solvents. Among these, long chain amines or some alkylphosphates are preferably used. As long chain amines may be mentioned the secondary amines, such as those commercially available under the trade name "Amberlite LA 2" of Rohm and Haas Society, tertiary amines such as those commercially available under the trade name "Alamine 336" of the General Mills Society, quaternary ammonium derivatives, such as those commercially available under the trade name "Aliquat 336" of the latter Society. These amines are not pure products, but mixtures of several amines. The important point is the total number of carbon atoms in the alkyl chains; in order to have satisfactory water-insolubility characteristics, it should not be less than 18. The amines are not used alone, but in solution in an organic diluent such as xylene or higher molecular weight aromatic hydrocarbons, such as the product put on the market under the name "Solvesso." The amine concentration in the solution may be in the range of 0.1 to 0.5 mole per liter and preferably between 0.1 and 0.2 mole/l. Tributylphosphate, which has a remarkable oxidation stability is preferably used as the alkylphosphate. It can be used alone or in solution in a hydrocarbon but it is more advantageous to use it alone.

The sodium chromate solution used to reextract hexavalent chromium from the organic solvent has no particular characteristic. Its concentration can vary in a large range and can attain levels as high as 300 g $CrO_3$ per liter. Said solutions are generally obtained from the treatment of chromium ore (chromite). The ore, mixed with an alkaline reagent, soda or sodium carbonate, is heated to a high temperature in a furnace wherein solid sodium chromate is formed. Water is added to the mass discharged from the furnace which brings the sodium chromate into solution. After purification, the latter can be used directly for the reextraction of hexavalent chromium from the organic solution according to the invention. It normally has a concentration of about 250 g/l.

The practical embodiment of the invention is described hereinbelow, with reference to the appended single FIGURE which represents diagrammatically an installation which may be used for this purpose.

In a liquid-liquid extraction apparatus 31, of the mixer-decanter type comprising 4 levels, there is circulated countercurrently, on the one hand, the residual solution containing hexavalent chromium compounds from pipe 32, and on the other hand the organic solvent from pipe 33. The relative flow rate of the two solutions depends on the concentration of hexavalent chromium compounds in the residual solution. The higher the concentration of hexavalent chromium in the residual solution, the faster is the flow rate of organic solvent based upon the flow rate of the residual solution. Extraction is very rapid and the time of contact of the residual solution and the solvent is short. This situation is favorable to good storage of the solvent. The extraction rate of hexavalent chromium, expressed as the percentage of chromium having passed into the organic solvent, based on the chromium present in the residual solutions, is higher than 95% and can be as much as 99.7 to 99.9%. The concentration of hexavalent chromium in the organic solvent is in the range of 2 to 50g and generally 5 to 30g chromium per liter. The exhausted residual solution is withdrawn through pipe 34. The concentration of hexavalent chromium compounds therein is lower than 150 mg/l. It can be evacuated into the sewers after neutralization or if its concentration of sulphuric acid is sufficiently high can be used in another manufacturing process which does not require a pure acid.

The organic solvent containing hexavalent chromium is passed through pipe 35 into a mixer-decanter 36, identical to mixer 31 but comprising only one stage. A sodium chromate solution is supplied through pipe 37 and circulates in apparatus 36 countercurrently to the organic solvent. The chromium contained in the latter passes into the chromate solution which is converted into bichromate according to the reaction:

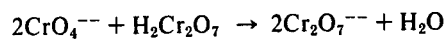

The solvent discharged from apparatus 36 still contains small amounts of hexavalent chromium. It is washed in a mixer-decanter 38, identical to apparatus 36 and also comprising only one stage, with a stream of water supplied through pipe 39. The temperature in the mixer-decanter 38 is in the range of 50° to 70° C and preferably between 60° and 65° C. The aqueous solution evacuated from the apparatus through pipe 40 is mixed with the chromate solution supplied through pipe 37 to apparatus 36. The solvent evacuated from apparatus 38 through pipe 33 containing less than 200 mg/l chromium and generally about 100 mg/l. It is passed directly to the last stage of extractor 31.

The sodium bichromate mg/l, collected by pipe 41 has a concentration of up to 350 g/l expressed as $CrO_3$. Its trivalent chromium amount is less than 150 mg/l. expressed as Cr.

EXAMPLE

In an installation similar to that shown in the FIGURE, a residual solution which is derived from a workshop manufacturing chromic acid is treated. This solution has the following composition:

$Cr^{6+}$:24.25 g/l
$Cr^{3+}$:0.50 g/l
acidity:4.67N

Said solution is passed through pipe 32 into extractor 31 at a flow rate of 1.0 l/h. Pipe 33 recycles tributyl phosphate at an identical rate.

An exhausted solution containing no more than 0.04 g/l $Cr^{6+}$ and 0.49 g/l $Cr^{3+}$ is withdrawn through pipe 34. The $Cr^{6+}$ recovery rate is 99.7%.

Tributyl phosphate is treated in extractor 36 with a sodium chromate solution supplied through pipe 37. It is obtained from a chromium ore lixivation installation. It has the following composition:

$Cr^{6+}$:126.7 g/l
$(OH)^-$:2.6N

The flow rate is 0.202 l/h.

The tributyl phosphate discharged from extractor 36 is washed at 62° C with a stream of water 0f 0.061 l/h; it is finally passed through pipe 33 into extractor 31 with a $Cr^{6+}$ concentration lower than 120 mg/l.

The aqueous solution at 40 is added to the sodium chromate solution and it leaves extractor 36 through pipe 41 at the following concentration:

$Cr^{6+}$:180 g/l
$Cr^{3+}$: ≤ 150 mg/l

The flow rate is 0.265 l/h.

It is passed directly into a sodium bichromate crystallization installation producing $Na_2Cr_2O_7, 2H_2O$.

We claim:

1. In a process for treatment of a residual solution containing a hexavalent chromium compound to render said solution non-polluting, comprising the steps of subjecting said solution to a liquid-liquid extraction with a water-insoluble organic solvent to dissolve substantially all of the said hexavalent chromium compound to form an organic solution thereof, and reextracting said dissolved hexavalent chromium compound from said organic solution with an aqueous solution; the improvement comprising using, for said reextraction of said dissolved hexavalent chromium compound from said organic solution, an aqueous sodium chromate solution, to produce a concentrated sodium bichromate solution.

2. The process of claim 1, wherein said residual solution contains from 0.01 to 200 g/l of said hexavalent chromium compound, expressed as $CrO_3$.

3. The process of claim 1, wherein said residual solution contains from 0.1 to 30 g/l of said hexavalent chromium compound, expressed as $CrO_3$.

4. The process of claim 1, wherein said water-insoluble organic solvent is an alkylphosphate.

5. The process of claim 1, wherein said water-insoluble organic solvent is tributylphosphate.

6. The process of claim 1, wherein the percentage of said hexavalent chromium compound extracted from said residual solution and dissolved into said organic solution is greater than 95%, and wherein the concentration of said hexavalent chromium compound dissolved in said organic solution is in the range of 2 to 50 g/l.

7. The process of claim 1, wherein the percentage of said hexavalent chromium compound extracted from said residual solution and dissolved into said organic solution is from 99.7% to 99.9%, and wherein the concentration of said hexavalent chromium compound dissolved in said organic solution is from 5 to 30 g/l.

8. The process of claim 1, wherein said organic solution is reextracted countercurrently with said aqueous sodium chromate solution.

9. The process of claim 1, wherein said organic solution, after having been reextracted, is washed with water at 50° to 70°C, such that said washed organic solution contains less than 200 mg/l of said hexavalent chromium compound.

* * * * *

UNITED STATES PATENT OFFICE
CERTIFICATE OF CORRECTION

Patent No. 3,856,917   Dated Dec. 24, 1974

Inventor(s) NICOLE TEXIER, JEAN-PIERRE CUER and MICHEL GABRIEL

It is certified that error appears in the above-identified patent and that said Letters Patent are hereby corrected as shown below:

Under Assignee: "Chimiques Uquine Kuhlmann, Paris, France"

should be

--Chimiques Ugine Kuhlmann, Paris France--

Signed and sealed this 22nd day of April 1975.

(SEAL)
Attest:

RUTH C. MASON
Attesting Officer

C. MARSHALL DANN
Commissioner of Patents
and Trademarks